Figure 1:
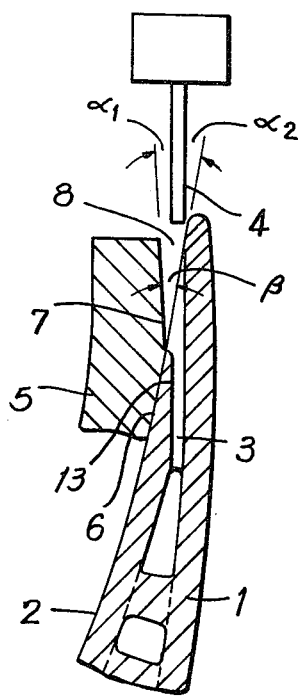

United States Patent [19]

Puhr-Westerheide

[11] 4,043,883
[45] Aug. 23, 1977

[54] ELECTROLYTIC PRECISION DRILLING PROCESS

[75] Inventor: Jörg Puhr-Westerheide, Birkenau, Germany

[73] Assignee: MTU-Motoren-und Turbinen-Union, Munich, Germany

[21] Appl. No.: 715,571

[22] Filed: Aug. 18, 1976

[30] Foreign Application Priority Data

Aug. 30, 1975 Germany ............................ 2538652

[51] Int. Cl.$^2$ ............................ B23D 1/00; C25F 3/00
[52] U.S. Cl. ............................ 204/129.65; 204/129.55; 204/229 M
[58] Field of Search ............................ 204/129.55, 129.65, 204/224 M

[56] References Cited

U.S. PATENT DOCUMENTS

| 3,196,093 | 7/1965 | Williams | 204/129.55 |
| 3,849,273 | 11/1974 | Johnson | 204/224 M X |
| 3,875,038 | 4/1975 | McKinney | 204/224 M |
| B 534,314 | 2/1976 | Andrews | 204/224 M |

Primary Examiner—Howard S. Williams
Assistant Examiner—D. R. Valentine

[57] ABSTRACT

An electrolytic precision drilling process for making one or more holes in a workpiece, the axis of which hole exhibits an inclination of between 2° to 20° relative to the surface of the workpiece, by means of at least one tubular electrode through which a stream of an electrolyte is directed onto the workpiece, comprising positioning a guide member during the drilling for sealing the gap between the guide member and the surface of the workpiece adjacent to the hole or holes, such that a surface of the guide member forms an angular space with the surface of the workpiece, the aperture angle of the angular space being twice the angle of inclination of the electrode relative to the surface of the workpiece, and the apex of which is in the area of a sharp upper edge of each hole. If one hole is drilled in this manner, the conical angular space is formed. If there are more holes, the angular space is substantially wedge-shaped, and in this case the guide member is preferably prismatic.

4 Claims, 2 Drawing Figures

ELECTROLYTIC PRECISION DRILLING PROCESS

This invention relates to an electrolytic precision drilling process for incorporating holes, the axes of which exhibit inclinations of about 2° to 20° relative to the surface of the work or workpiece by means of tubular electrodes through which a stream of electrolyte is directed on to the work.

The mechanics of electrolytic precision drilling are known from the German Patent Publication No. 2,135,207 and others. It has been shown, however, that when holes exhibit moderate inclinations relative to the surface of the work, i.e., when they are not at right angles to the surface of the work as would be common practice, the known electrolytic precision drilling processes are ill-suited in that undue amounts of material are removed in the area of the blunt front edge of such holes, making the diameter of such holes unacceptably large near the surface of the work. Such excessive removal of material is due to the electrolyte forming a field of turbulence containing hydrogen bubbles in the narrow angle between the tubular electrode and the work. This reduces the electric resistance in that area considerably and causes severe peak currents. However, it is exactly at narrow angles with the surface of the work that electrolytic precision drilling processes would be preferred, considering that in applications such as these, twist drills tend to slip and give considerable trouble.

In a broad aspect the present invention provides a process making it possible to incorporate holes at moderate angles relative to the surface of the work by the electrolytic precision drilling method but in the absence of the attending disadvantages mentioned above.

It is a particular object of the present invention to provide a drilling method where during the drilling process a preferably prismatic guide member is positioned on the surface of the work for sealing action such that one surface of this guide member forms, together with the surface of the work, a conical angular space the aperture angle of which is about twice the angle the tubular electrode forms with the surface of the work, and the apex of which is in the area of the sharp upper edge of the hole. The cardinal advantage of this process of the present invention is that the conical angular space formed around the tubular electrode operates to achieve smooth a return flow of the electrolyte to carry the hydrogen bubbles with it at a great velocity, and that the inclination of the tubular electrode is from the start selected to suit the axis of the hole. Additionally, the guide member serves to prevent the stream of electrolyte from wetting very large areas around the actual hole.

In a further aspect of the present invention the process for simultaneously incorporating several parallel holes in line is characterized in that the use of the prismatic guide member produces a wedge-shaped angular space confined by plane surfaces, the cutting edge of which extends tangentially to the sharp edges of the holes. The advantage of this alternative process is chiefly that it makes it possible to incorporate rows of holes or also narrow slots (resulting from adjacent individual holes closely spaced in line), and that the guide member needed for the purpose exhibits an especially simple exterior shape.

In a further aspect of the present invention the guide member is urged against the surface of the work by means of a suitable clamping device to seal the gap between the guide member and the surface of the work. This clamping provision is the simplest method of joining the guide member to the surface of the work for maximum sealing, and it adds little to the cost in that in electrolytic drilling means must anyway be provided for holding the work, and in that this holding means can readily be provided as a clamping means. Sealing the gap between the guide member and the surface of the work is important in that not the smallest amount of electrolyte must be allowed to pass through the gap to cause undue removal of material.

In a still further aspect of the present invention the guide member is made of a material which forms stable passive layers in nitric or sulphuric acid even in the presence of anodic polarisation, such as graphite or stainless ferritic steels per German Standard DIN 17006, e.g., X10Cr13. Use of such materials is preferred for the reason that they are resistant to the electrolyte, which may be nitric acid, sulphuric acid or some other fluid, and that the guide member should not be too brittle to compensate moderate misfit of the mating surfaces by elastic deformation. Finally, the material for the guide member should not be too expensive, a requirement which is likewise met by the materials mentioned.

Figure 2:
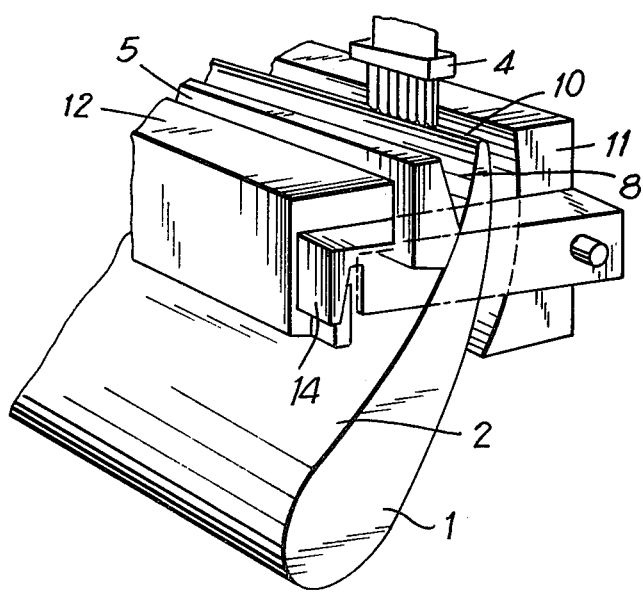

Further objects and advantages of the present invention will become apparent from the following detailed description read in the light of the accompanying drawing, in which FIG. 1 is a plan view that illustrates in cross-section a schematic arrangement to implement inventive process; and FIG. 2 is a perspective view of an arrangement for simultaneously incorporating in a workpiece several parallel holes in a row.

With reference now to FIG. 1, a turbine blade or workpiece 1 is shown with its rear portion and sharp trailing edge only, with the sharp trailing edge looking radiused owing to the enlarged view. A concave surface 2 of the work or workpiece 1 is to be provided with a hole 3 by electrolytic precision drilling in approximately the direction of the longitudinal centerline of this blade. For the purpose, a tubular electrode 4 is positioned directly adjacent to the concave surface 2 and is oriented such that its centerline coincides with the axis of hole 3. Before the stream of an electrolyte is allowed to flow from the tubular electrode 4 (arrowhead) a guide member 5 is positioned for sealing action (see sealing surface 6) such that a further surface 7 of the guide member 5 is formed with part of the surface 2 of the work, a conical angular space 8, an aperture angle $\beta$ of which is about twice the inclination $\alpha_2$ of the tubular electrode 4 relative to the surface 2 of the work. The guide member 5 is positioned such that the apex of the angular space 8 is in the area of a sharp upper edge 13 of the hole 3.

The process arrangement shown in FIG. 2 serves to incorporate several parallel holes in a row in one pass. The numeral 1 again indicates a turbine blade to be provided on its concave surface 2 with the holes (3 in FIG. 1) extending from a trailing edge 10 in lengthwise direction of the blade. This may be a row of several parallel holes spaced apart or it may be a slot formed by several closely spaced holes opening into the other. The tubular electrode 4 accordingly comprises a plurality of adjacent tubular electrodes. To implement the drilling process, then, the guide member 5 is used with a prismatic form and having the sealing surface 6 is positioned on a concave surface of the work and urged against it by means of a clamping device.

The clamping device consists of jaws 11 and 12 closed by a lever 14 cooperating with a wedge member. This clamping device may be substituted, however, by any other clamping means suitable for clamping the guide member 5 to the work 1. The prismatic guide member 5 forms, together with the surface 2 of work 1, the angular space 8 that is here wedge-shaped and is confined by plane surfaces, where the prismatic guide member 5 is positioned such that the cutting edge of the angular space 8 extends tangentially to the sharp upper edges (13 in FIG. 1) of the holes 3 to be incorporated in the work 1 by means of the tubular electrodes 4. A cross-sectional view of the arrangement of FIG. 2 would exactly reflect that shown in FIG. 1 for incorporating one hole.

Regarding the position of the guide body 5 relative to the holes 3 and the aperture angle of the angular space 8, then, the relationships of the arrangement according to FIG. 2 are the same as those of the arrangement according to FIG. 1.

When incorporating a slot of constant width, the intended cross-section of the slot is achieved after a first pass when a passage consisting of several, overlapping circular cross-sections is produced in line. In one or more subsequent machining stages tools are used which correspond in number to those described for the tubular electrodes, less one, and which are shifted in position by one-half the tube spacing in the longitudinal direction of the slot relative to the central electrode position in the first pass.

What I claim is:

1. An electrolytic precision drilling process for making at least one hole in a workpiece, the axis of which hold has an inclination of between 2° and 20° relative to the surface of the workpiece, by means of least one tubular electrode through which a stream of an electrolyte is directed onto the workpiece, comprising the step of positioning a guide member during the drilling for sealing the gap between the guide member and the surface of the workpiece adjacent to the at least one hole, such that a surface of the guide member forms an angular space with the surface of the workpiece, the aperture angle of the angular space being twice the angle of inclination of the electrode relative to the surface of the workpiece, and the apex of which is in the area of a sharp upper edge of each hole.

2. An electrolytic precision drilling process as defined in claim 1, for making at least two substantially parallel holes in a row in one pass, further comprising the step of producing the angular space confined by plane surfaces with the guide member which is prismatic, the angular space being substantially wedge-shaped, and the cutting edge of which extends tangentially to the sharp upper edges of the holes.

3. An electrolytic precision drilling process as defined in claim 1, further comprising the step of urging the guide member against the surface of the workpiece by means of a clamping device to accomplish the sealing of the gap.

4. An electrolytic precision drilling process as defined in claim 1, wherein the guide member is made of a material which forms stable passive layers in the electrolyte, e.g. nitric or sulphuric acid, despite the presence of anodic polarization, such as graphite and stainless ferritic steels.

* * * * *